Inventor:
Noel G. Artman
By John W. Gaines
Atty.

# United States Patent Office 3,425,754
Patented Feb. 4, 1969

3,425,754
TRACK PIN AND BUSHING SEAL ASSEMBLY
Noel G. Artman, Geneva, Ill., assignor to International Harvester Company, Chicago, Ill., a corporation of Delaware
Filed Oct. 23, 1967, Ser. No. 677,096
U.S. Cl. 305—11    11 Claims
Int. Cl. B62d 55/20; F16g 13/07; F16j 15/54

ABSTRACT OF THE DISCLOSURE

Track pin and bushing seal assembly having a self-reverting frusto-conical thrust washer therein which, during assembly, inverts elastically from having frusto-conicity as viewed in one axial direction, to a state of inversion having the frusto-conicity in the opposite direction. A reversal of those steps occurs as the assembled joint wears in service, with the effective spring height of the washer being especially pronounced for wear take-up purposes. Specifically, the thrust washer undergoes two-stage expansion, evolving from the slope of one frusto-conicity, thence through a flattened state, to the opposite slope of frusto-conicity.

---

This application relates to a single-element-type rotary metal seal for the pins and bushings in a track chain of a crawler vehicle, such seal fitting in a seal recess formed within a side link at each joint in the track chain. The element is a self-reverting spring steel Belleville washer which, progressively during assembly, first flattens elastically from an initial frusto-conical shape sloping one way, second completely inverts elastically to an ultimate frusto-conical shape sloping the other way, and thereafter from its trapped position continually tries to restore itself back to its initial frusto-conical shape and slope. The washer elastically resists axial deflection and thus gradually and continually re-expands in service as a follow-up or self-compensating seal which automatically takes up for axial wear occurring in the joint.

According to practice in the past, a stack of Belleville spring washers has been put to use, arranged in immediate engagement at their similar ends so as to provide a thrust seal when flattened under preload. It takes at least two of those individual washers, an inherency of which is that each can expand no more than from flat state to its full spring height in contributing to the necessary take-up travel. Also, their adjacent ends coincide in only one common circle and it has therefore been in inherency of the practice that, if adjacent washers shift slightly eccentrically to one another in any radial direction, their interface of contact is reduced to two, high stress points only, rather than being distributed in a full circle of contact.

Among others, one disadvantage is that a stack of those prior art parts represents on its face an undesired duplication or multiplication of the parts required. A further disadvantage of the stacking of duplicate parts is that those prior art engaged springs may be beset with a sealing difficulty. Another disadvantage is the difficulty that the interface, where relative rotation occurs, may transfer from an inter-spring wear area as desired to an inter-recess-and-spring wear area which is undesired.

The foregoing difficulties are materially reduced or substantially eliminated by my inventions of a single element seal structure and its method of assembly in a joint, which seal structure because of the availability of added travel due to its inversion characteristic effectively eliminates duplication of parts in the joint and insures that the sealing locus will never be against two points only but always against a full surface, as will now be explained in detail. Further features, objects, and advantages will either be specifically pointed out or become apparent when, for a better understanding of my inventions, reference is made to the following description taken in conjunction with the accompanying drawing, which shows a preferred embodiment of the assembled structure and method and in which:

Figure 1:
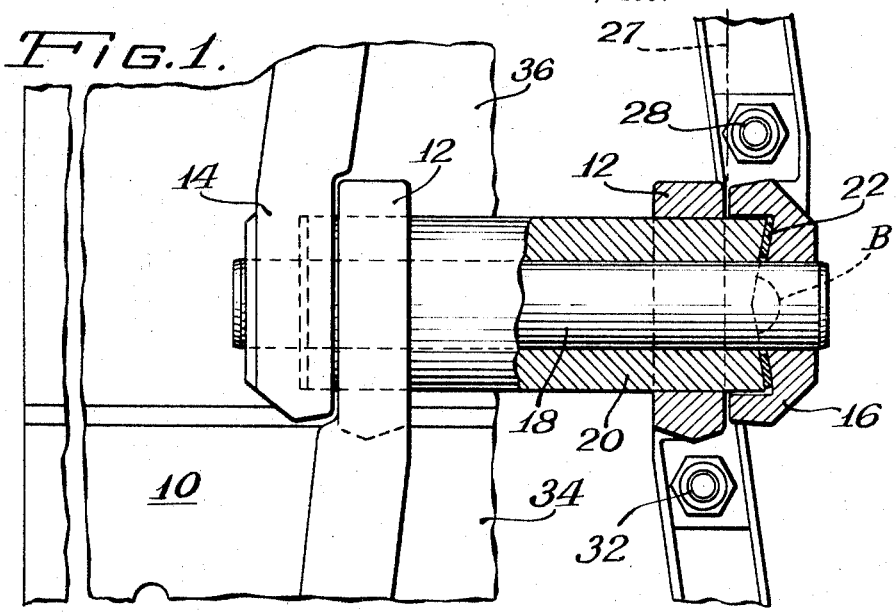
FIGURE 1 is a post-assembly showing, in sectioned plan view, of part of a crawler vehicle track chain embodying the present inventions.

More particularly as shown in the drawing, each regular joint in a track chain assembly 10 as illustrated includes two links having inner portions referred to as inner links 12, two more links having outer portions referred to as respective outer links 14 and 16, an interconnecting pin 18 and a pin bushing 20 rotatable thereon, and a single, combined metal face seal and thrust washer 22 compressed under pretension in the space of a seal recess 24 formed in an inside face of each of the outer links 14 and 16.

The two washers 22 are disposed one at each end of the bushing 20 in the joint, and serve both as a thrust transmitting means for end thrust transmitted by the bushing into the adjacent outer link, and as a rotary seal keeping out the dirt and keeping in a coating of lubricant, not shown, which is sealed-in between the pin 18 and the bushing. The seal recess 24 in each outer link results from counterboring same to an axial depth sufficient to completely house therein the projecting thrust end of the bushing 20, thereby offsetting the end face of the bushing and the confronting seal 22 from a plane 27 between the links and from the consequent direct ingress of dirt.

A bolt 32 is included in a four-bolt group to secure the inner links to a leading track shoe 34 carried thereby, and the next or relatively trailing shoe 36 is secured to the respective outer links 14 and 16 by a similar four-bolt group including a bolt 28. During forward motion of the vehicle, not shown, the so-called leading shoe 34 is the first one of the two to strike the ground and is the first one of the two to reach the drive sprocket of such vehicle, as equipped with the present crawler track chain.

The links are heat treated steel forgings having a hardness reading in the base of the recesses 24 approximately in a range between Rockwell C20 and Rockwell C25. Washers 22 are a harder spring steel, preferably much harder than the forgings.

ASSEMBLY

At the time of beginning the final stage of assembly of the joint, the parts fitted up at that time consist of the two inner links 12 and the pin 18, which have respectively an interference fit on the outside of the bushing 20 achieved with a power press, and a hinge fit with the bushing 20 which, after lubrication of the bore in the bushing, is achieved by sliding the pin 18 into the bushing until it projects at each end beyond the corresponding end of the bushing 20.

Figure 2:
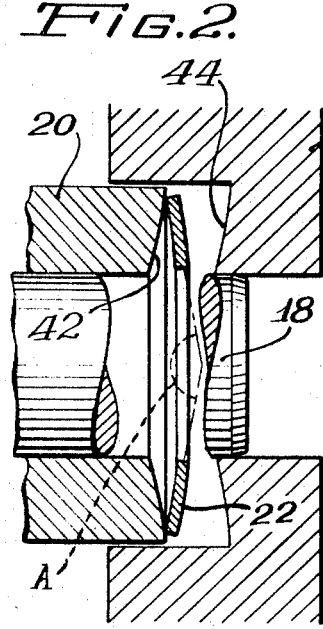
FIGURE 2 is a pre-assembly showing, to enlarged cross-sectional scale, of a detail of FIGURE 1.

A washer 22 at each end is added loosely over the projecting end of the pin 18, which latter has a horizontal position at the time as illustrated in FIGURE 2. Then the respective links 14 and 16 at each end of the pin 18 are brought into registry therewith, as exemplified in FIGURE 2 by the link 16, for pressing thereonto into a final force fit.

Figure 3:
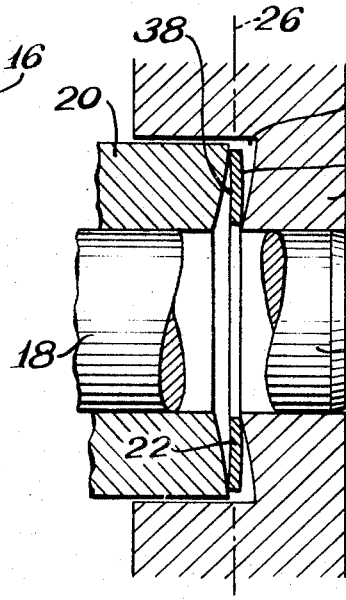
FIGURES 3 and 4 are similar to FIGURE 2, but show, respectively, assembly at an intermediate stage and the final assembly.
Figure 4:
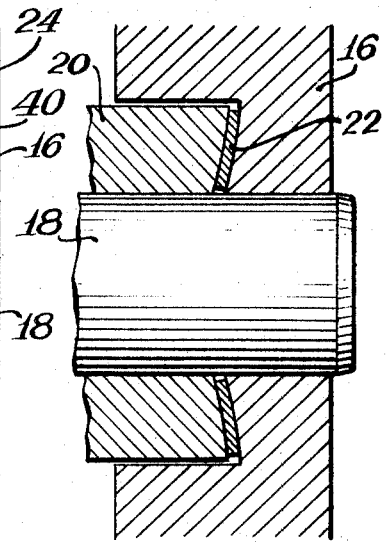

A power press, not shown, forces the outer links 14 and 16 onto and along the outer ends of the pin 18 toward one another. When relative axial movement stops, the bushing 20 acts as spacer, and the press pressure is then allowed to build to a predetermined force value, at which time the washers 22 have evolved from the slope of one frusto-conicity, as illustrated in FIGURE 2, through flattening as illustrated in FIGURE 3, and thence to take the opposite slope of frusto-conicity as illustrated in FIGURE 4. Thereafter, pressure is released in the press and the assembly is removed complete, for the bolting thereonto of the track shoes.

It will be noted in the free state of the washer 22 the slope is such that the apex of the cone angle A, FIGURE 2, falls along the spring axis at an outer point, whereas the slope of the inverted spring causes the apex of the cone angle B, FIGURE 1, to fall along the spring axis at relative medial or inner point thereto.

From the foregoing, it is seen that the step of interpositioning, in the path of assembly of an outer link part and a bushing part, a self-reverting, substantially frusto-conical spring washer having generally circular outer and hub edges, each disposed on a different one of the sides of an intermediate plane 26 of reference through the washer, is followed by a two-stage sequence of progressive bending of the washer into place comprising, as final steps of the method: transitory planar deflection of the washer by an ordinate amount causing general flattening (FIGURE 3) accomplished by initially forcing at least one of the parts toward the other and characterized by the outer and hub edges of the washer, from a state of under-deflection of the washer, being bent therewith in common into the plane of reference; and over-deflection of the washer by an amount causing substantial inversion (FIGURE 4) accomplished by continuing forcing one of the parts toward the other and characterized by the outer and hub edges each progressing, from its respective side, through and substantially past the plane 26 of reference so as to transfer to the opposite side, causing an accumulation of appreciable elastic energy stored in the washer for taking up wear.

OPERATION

In operation in a new joint, the steel of the washer 22 shows signs of thinning down and the thickness of the recess 24 starts to grow, with the first perceptible increment of rotative wear. So in lieu of the initial coextensive face-to-face contact made by the washer 22 at each side with the confronting recess base part or bushing thrust end part at that side, the outer periphery of the face 38 of the washer illustrated at the bushing side exerts a ring of pressure contact tending more and more to vacate the inner circumference and to concentrate along the outer periphery of the thrust end part of the bushing. The inner periphery of the washer along the face 40 thereof illustrated at the base part side exerts a ring of pressure contact tending more and more to vacate the outer periphery and to concentrate along the inner circumference of the base part of the recess 24 in the link 16.

During wear, the washer 22 continually tries to restore itself back to the initial frusto-conical shape and slope of its free state as shown in FIGURE 2. The unhesitating transition through the flat position, due to self-reverting characteristics of the Belleville washer, can readily be visualized once FIGURE 3 is referred to.

SELF-REVERSION

In the design of a Belleville washer having a comparatively large height to thickness ratio, one way to insure self-reversion is to avoid a strict straight cone-shape by cold working or otherwise imparting a permanent curve at one or more points in the washer as viewed in cross section. Merely a slight concavo-convex curvature throughout the cross section of the washer has been found satisfactory, and I prefer it.

So in practice, the washer face 38 at the bushing side is the concave inner face of the present washer when under-deflected as shown in FIGURE 2, and is the concave outer face of the washer when over-deflected (i.e., inverted or turned or flipped inside out) as shown in FIGURE 4. The face 40 at the side with the base part is the convex outer face of the washer 22 when under-deflected, and is the convex inner face of the washer 22 when over-deflected as shown in FIGURE 4.

Consequently, to insure that the seal recess space defined between the parts 16 and 20 is complementary so that the washer will not take a permanent set of unnatural formation, the thrust end of the bushing 20 is recessed so as to have a convex taper cone 42, and the base part of the seal recess 24 has a corresponding concave bevel 44. Thus, the actual seal recess space defined is initially very thin and is only approximately frusto-conical as illustrated in FIGURES 1 and 4.

If the slightly hollowed or inwardly relieved bevel 44 is changed so as to be vice versa by presenting a slight bulge or bow as viewed in cross section, and if the bulging convex taper or cone 42 is made vice versa, a modified Belleville washer 22 can be interposed with satisfactory results which, when under-deflected, has a concave outer face and a convex inner face, and when over-deflected has a convex outer face and a concave inner face.

If the frusto-conical washer modification just described is the one preferred for use, then for compatibility therewith the thrust end of the bushing can also be formed so as to have a convex bevel to confront the concave face of the washer, whereas the base of the recess can, for consistency, be recessed concave conically in confrontation with the convex face of modified washer.

The thickness of the washer 22 is deliberately exaggerated as herein illustrated, simply for ease and clarity in drafting. It is evident in the course of the full travel of the washer 22, in respectively bending and unbending between the extreme positions in which it has an angle of conicity A and an opposite or flipped-over angle of conicity B, that the effective spring height in terms of the usual Belleville spring is in excess of actual spring height by a factor greater than unity and, theoretically at least, the ratio of effective to actual height is about 2 to 1. It follows from the resulting double travel capability that one self-reverting Belleville spring hereof if used makes possible the elimination of a part, when compared to the prior double Belleville sealing arrangements using two regular Belleville washers.

What is claimed is:

1. In a sealed and thrust-spring-loaded joint in which a pin bushing and a link are relatively rotatably interconnected by a track pin, said bushing having a thrust end part projecting both toward the base part of a bushing recess in the link, and at least partway into the latter and arranged therewith so that the parts mutually define a generally frusto-conical seal recess:
    the improvement, interposed in combination with said parts, of a self-reverting spring washer forced into substantial inversion under pretension in, and made to conform substantially coextensive with, said generally frusto-conical seal recess by forcing one of said parts toward the other.

2. The invention of claim 1, characterized by
    one of said parts being generally beveled and the other being generally convex conical, to impart the desired form to the intervening frusto-conical seal recess defined thereby.

3. The invention of claim 2, further characterized by the base of the recess constituting said beveled part and the end of the bushing being recessed convex conically.

4. The invention of claim 1, the washer characterized by a spring of thin steel concavo-convex in free state.

5. The invention of claim 1, the washer in free state characterized by a convex outside face and a concave inner face.

6. The invention of claim 5, the inverted washer characterized by a concave outside face and a convex inner face.

7. The invention of claim 1, the washer characterized by general frusto-conicity and an effective spring height in excess of its actual spring height by a factor greater than unity for wear take-up purposes, due to a two-stage expansion evolving from the slope of one frusto-conicity, thence through flattening, to the opposite slope of frusto-conicity.

8. Method of placing a combined seal-and-thrust washer under pretension, during the final assembly of a track link joint, to maintain a thrust preload on such joint for for wear take-up purposes in service, said joint comprising a link and a pin bushing, which link and bushing are relatively rotatably interconnected by a track pin, and which link is formed with a bushing recess therein so as to receive, in a path of relative movement in the direction of a base part of said recess, a projecting thrust part of the pin bushing; comprising as steps of said method: the interposition in said path of a self-reverting, substantially frusto-conical spring washer having generally circular outer and hub edges each disposed on a different one of the sides of an intermediate plane of reference through the washer;

transitory planar deflection of said washer by an ordinate amount causing general flattening, accomplished by initially forcing at least one of said parts toward the other and characterized by the outer and hub edges of the washer, from a state of under-deflection of the washer, being bent therewith in common into the plane of reference; and over-deflection of said washer by an amount causing substantial inversion, accomplished by continuing forcing one of said parts toward the other and characterized by the outer and hub edges each progressing, from its respective side, through and substantially past the plane of reference so as to transfer to the opposite side and cause the accumulation of appreciable elastic energy stored in the washer for taking up wear.

9. The invention of claim 8, the free washer characterized by being concavo-convex.

10. The invention of claim 8, the washer, when over-deflected past general flattening, characterized by a concave outer face and a convex inner face.

11. The invention of claim 10, the under-deflected washer characterized by a convex outer face and a concave inner face.

References Cited

UNITED STATES PATENTS

| | | | |
|---|---|---|---|
| 1,971,169 | 8/1934 | Wheeler | 277—81 X |
| 2,208,276 | 7/1940 | McCann | 287—101 |
| 3,050,346 | 8/1962 | Simpson | 305—11 |
| 3,110,524 | 11/1963 | Zeller | 305—11 |
| 3,336,089 | 8/1967 | Krickler | 305—11 |

RICHARD J. JOHNSON, *Primary Examiner.*

U.S. Cl. X.R.

74—255; 277—95